United States Patent [19]

Yamada et al.

[11] Patent Number: 4,622,202
[45] Date of Patent: Nov. 11, 1986

[54] REACTOR IN-VESSEL SENSOR AND CORE MONITORING APPARATUS

[75] Inventors: Izumi Yamada, Ibaraki; Hajime Yamamoto; Mikiyasu Tsunashima, both of Hitachi, all of Japan

[73] Assignee: Hitachi, Ltd., Tokyo, Japan

[21] Appl. No.: 519,698

[22] Filed: Aug. 2, 1983

[30] Foreign Application Priority Data

Aug. 25, 1982 [JP] Japan .................. 57-147097

[51] Int. Cl.[4] ................ G21C 17/00; G01R 33/00
[52] U.S. Cl. ......................... 376/246; 374/117; 374/142; 376/247; 376/252; 73/198; 73/861.11
[58] Field of Search .............. 376/246, 247, 252; 374/117, 142, 176; 73/198, 861.11

[56] References Cited

U.S. PATENT DOCUMENTS 3,940,996  3/1976  Lauhoff et al. .................. 73/198
3,940,996  3/1976  Lauhoff et al. .................. 376/246
3,987,362 10/1976  McCann et al. ................ 324/30 A
4,535,638  8/1985  Eernisse et al. .................. 374/117

FOREIGN PATENT DOCUMENTS 2214891  8/1974  France .
2481798  6/1981  France .

OTHER PUBLICATIONS

IEEE Trans. on Nuc. Sci., vol. NS-18, No 1 (2/71) pp. 340-343, New York, U.S., Gavin et al.
S 4369 0232, Journal of Physics E, vol. 7, No. 2, pp. 69-75 (1/74) Hayes, "Instrumentation of Liquid Sodium in Nuclear Reactors".

Primary Examiner—Salvatore Cangialosi
Attorney, Agent, or Firm—Antonelli, Terry & Wands

[57] ABSTRACT

A sensor for monitoring the interior of a sodium-cooled fast breeder reactor comprises a pair of symmetrical magnetic cores, a magnetostrictive or piezoelectric vibrator element bonded to one of the cores, a primary coil and a plurality of secondary coils surrounding the magnetic cores, and a container enclosing the above members. The primary coil applied with an exciting alternating current generates an acoustic signal voltage indicative of sound, if any, originated in the interior of the reactor. The magnetic flux produced by the exciting current is influenced by the temperature and flow velocity of sodium flowing around the sensor, and corresponding voltage signals resulting from the changed magnetic flux are induced in the secondary coils.

10 Claims, 6 Drawing Figures

REACTOR IN-VESSEL SENSOR AND CORE MONITORING APPARATUS

This invention relates to an in-vessel sensor used for monitoring the internal state of a nuclear reactor and also to a core monitoring apparatus using such a sensor. More particularly, the present invention relates to an in-vessel sensor and core monitoring apparatus of the kind above described which are suitable for incorporation in a sodium-cooled reactor for detecting a core anomaly such as a flow blockage of the coolant within the fuel assemblies and for monitoring a condition on dislocating of the position of the fuel assemblies.

As means for monitoring the internal state of a reactor such as a fast breeder reactor for the purpose of detection of a core anomaly such as a flow blockage of the reactor coolant, an eddy-current type sensor metering the temperature and flow velocity of the coolant has been installed for each of the fuel assemblies or installation of such sensors has been planned. Japanese Patent Kokoku (Post-Exam. Publication) No. 9678/80 discloses metering of the temperature and flow velocity of the coolant. Further, for the purposes of detection of a loose part on the basis of sound generated due to vibration of such a loose part, detection of admixing or drawing of the cover gas such as argon from the sodium pump in the primary cooling system of the reactor into the coolant on the basis of detection of bursting sound of gas bubbles existing in the coolant, and early and reliable detection of boiling of sodium, acoustic transducers have also been provided in a number small compared with that of the fuel assemblies.

The prior art referred to above will be explained with reference to FIGS. 1 and 2. FIG. 1 is a schematic longitudinal sectional view of a sodium-cooled reactor equipped with a double rotary plug. Sodium at a low temperature fed from an inlet 9 disposed at a lower part of a reactor container 1 flows into the reactor core 8 and then through guide paths of a flow guide 11 disposed thereabove to be finally discharged as sodium at a high temperature from an outlet 10 of the reactor container 1. The upper part of the reactor container 1 is covered with a double rotary plug 3 which is composed of a stationary plug 2, a large rotary plug 4 disposed in eccentric relation with the stationary plug 2 and a small rotary plug 5 disposed in eccentric relation with the large rotary plug 4. Because of such a structure of the double rotary plug 3, the small rotary plug 5 can be situated at any desired position above the core 8 in the reactor container 1 as required. A control rod actuating mechanism 12, a cable 13 connected to reactor in-vessel sensors, described later, and an insertion hole for a fuel exchange mechanism (not shown), etc. are disposed in or extend through the small rotary plug 5. A reactor-upper mechanism 6 in contact with the inner periphery of the small rotary plug 5 depends toward the core 8 to terminate in a position above the core 8 and contains therein the sensor cable 13, control rod guide tubes 52, etc. An eddy-current type sensor 21 metering the temperature and flow velocity of the coolant, sodium, is contained in a well 7 as shown in FIG. 2 and is connected to the sensor cable 13 extending from the exterior of the reactor into the flow guide 11 through the reactor upper mechanism 6.

FIG. 2 is a schematic sectional view showing the structure and installation of the eddy-current type temperature-velocity sensor 21. Referring to FIG. 2, a sensor container 93 contains therein a magnetic core 16 of pure iron which is ferromagnetic material, a primary coil 14 wound around the core 16, and a pair of secondary coils 15 and 15' also wound around the core 16 and electromagnetically coupled to the primary coil 14 for detecting the temperature and flow velocity of sodium, and such a sensor container 93 is disposed within the well 7. The well 7 terminates at its lower end in each of the guide paths of the flow guide 11 disposed immediately above the fuel assemblies in the core 8. Sodium flowing while making heat-exchange contact within the fuel assembly in the core 8 flows then upward while making contact with the outer surface of the well 7 in which the temperature-velocity sensor 21 is disposed. The AC magnetic flux generated from the primary coil 14 is influenced firstly by the flow velocity of sodium flowing around the well 7 due to the electrical conductivity of sodium and secondly by the electrical resistance, hence, the temperature of sodium. Therefore, the voltages induced in the pair of secondary coils 15 and 15' wound in a symmetrical relation around the core 16 are each a function of the temperature and flow velocity of sodium. When the flow velocity of sodium increases, the voltage induced in the secondary coil 15, the voltage induced in the other secondary coil 15' decreases. Thus, the flow velocity of sodium is sensed by taking the difference between these two induced voltages. On the other hand, when the electrical resistance of sodium increases due to a substantial change in the temperature of sodium, the value of eddy current caused by the AC magnetic flux of the primary coil 14 decreases, and, as a result, both of the two induced voltages increase. Thus, the temperature of sodium is sensed by taking the sum of these two induced voltages. Consequently, it is possible to detect occurrence of a core anomaly such as a flow blockage within the fuel assemblies.

FIG. 3 is a schematic sectional view of an acoustic transducer 17 constructed in an intermediate step of the effort which leads to the present invention. The transducer 17 illustrated in FIG. 3 has a piezoelectric element 18 built therein, and is disposed in a well 7'. The well 7' is disposed at a position similar to that at which the eddy-current type temperature-velocity sensor shown in FIG. 2 is disposed in the reactor. The material of the piezoelectric element 18 is commonly lithium niobate (LiNbO$_3$) The signal voltage generated from the piezoelectric element 18 is transmitted by a heat-proof cable 19 to the reactor-in-vessel sensor cable 13. Molten metal 20 is contained in the well 7' so as to ensure satisfactory transmission of sound between the acoustic transducer 17 and the well 7'. This metal is commonly a low-melting one such as indium. The piezoelectric element 18 generates an acoustic signal by making expansion and contraction in response to sound transmitted to the acoustic transducer 17 from sodium flowing around the well 7', and, on the basis of this acoustic signal, troubles such as boiling of sodium, drawing of cover gas into sodium and presence of a loose part can be detected.

Although the eddy-current type temperature-velocity sensor 21 has been provided for each of the fuel assemblies in the prior art arrangement described above, it has been extremely difficult to provide the acoustic transducer 17 for each of the fuel assemblies due to the absence of utilizable space, and, therefore, the number of acoustic transducers 17 that can be provided had to be limited to a few or a number quite smaller that that of the fuel assemblies. However, the provision of such a quite small number of acoustic transducers has been defective in that the detectable range of the acoustic signal is limited resulting in extreme difficulty of determination of the source of sound, and the difference between the location of sensing the temperature and velocity of the coolant and the location of sensing the sound results in degraded accuracy of analysis of abnormal phenomena.

With a view to obviate the prior art defects pointed out above, it is a primary object of the present invention to provide a reactor in-vessel sensor of small size including a temperature-velocity sensor and an acoustic sensor combined into an integral unit and housed in a well so that temperature, velocity and acoustic information can be obtained for each of the fuel assemblies, and to provide also a core monitoring apparatus using the sensor of the character above described.

In accordance with one aspect of the present invention, there is provided a sensor for monitoring the interior of a reactor, comprising a magnetic core member including a magnetostrictive or piezoelectric vibrator element in a portion thereof, a primary coil excited by an alternating current, a plurality of secondary coils electromagnetically coupled to the primary coil, the primary and secondary coils surrounding the magnetic core member, and a casing enclosing the magnetic core member and the primary and secondary coils, whereby the temperature and velocity of a conductive liquid flowing outside of the casing are sensed, and sound wave originated in the conductive liquid is received by the primary coil through the vibrator element.

In accordance with another aspect of the present invention, there is provided an apparatus for monitoring the interior of a reactor, comprising a reactor in-vessel sensor of the character above described, a low-pass filter or a band-pass filter through which the voltage signal induced in the plural secondary coils are passed to be then subjected to addition and subtraction processing in an arithmetic processing unit thereby deriving signals indicative of the temperature and velocity of a conductive liquid flowing around the sensor, and a high-pass filter or a band-pass filter through which the voltage signal induced in the primary coil is passed to be then subjected to detection by a detector thereby deriving a signal indicative of sound generated from the conductive liquid flowing in the reactor.

The above and other objects, features and advantages of the present invention will be apparent from the following detailed description of preferred embodiments thereof taken in conjunction with the accompanying drawings, in which.

Figure 1:
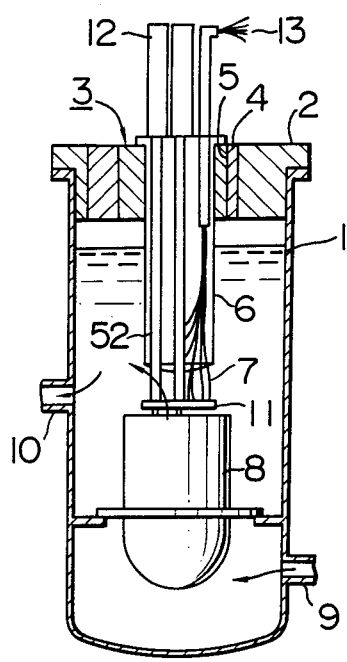
FIG. 1 is a schematic sectional view of a sodium-cooled reactor equipped with a double rotary plug.
Figure 4:
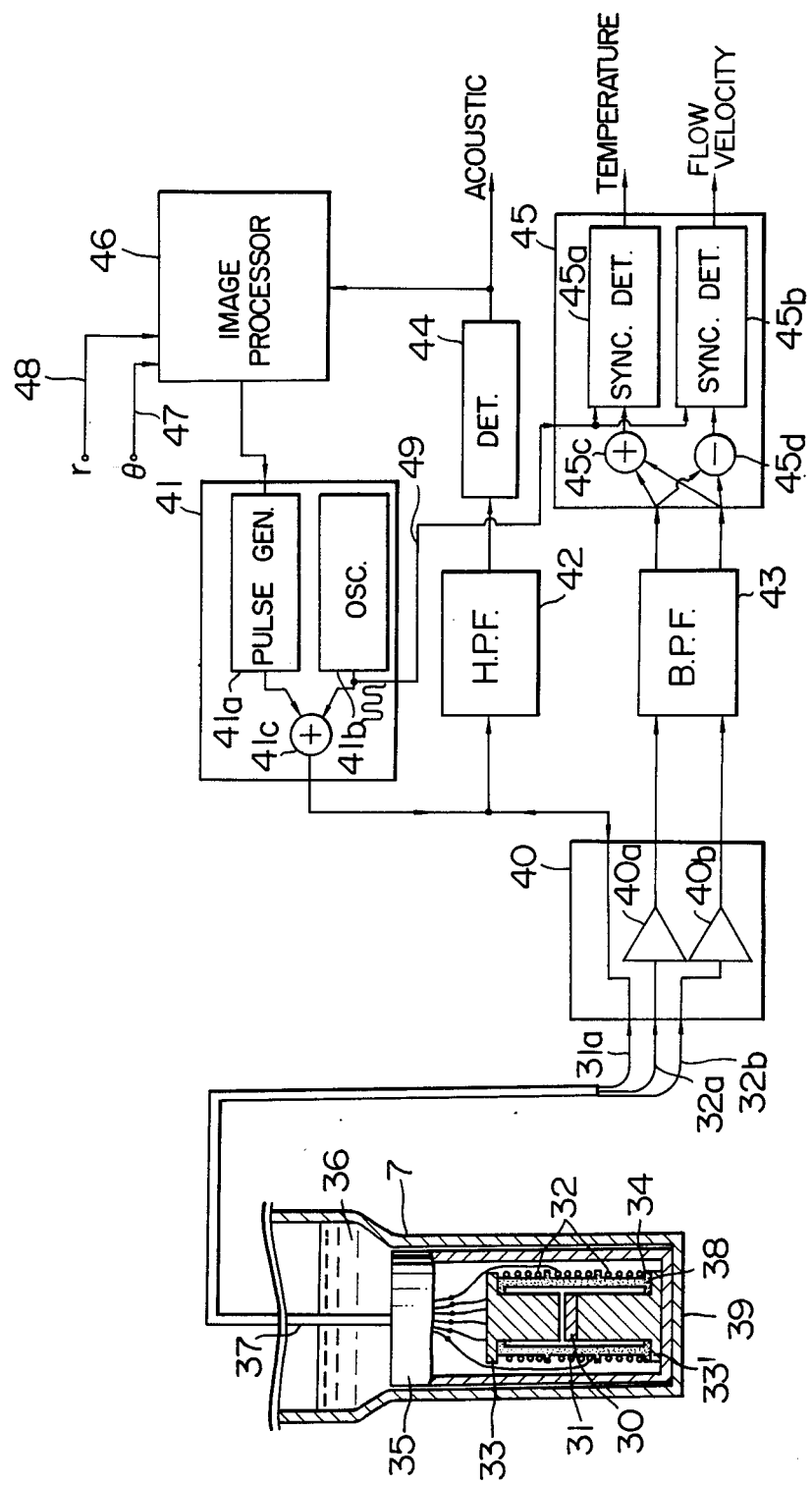
FIG. 4 is a schematic sectional view of an embodiment of the reactor in-vessel sensor and a block diagram of a signal processing system connected to the sensor in an embodiment of the core monitoring apparatus according to the present invention.

An embodiment of the present invention will now be described in detail with reference to FIG. 4. FIG. 4 shows a reactor in-vessel sensor 35 sensing the temperature and flow velocity of a coolant and sound originated in the coolant to generate signals indicative of the sensed temperature, velocity and sound, and shows also a signal processing system connected to the sensor 35. Although such a reactor in-vessel sensor 35 is actually provided for each of fuel assemblies, that associated with one of the fuel assemblies is only shown in FIG. 4 for simplicity of illustration. The reaction in-vessel sensor 35 is housed in a well 7 and disposed in a guide path of a flow guide 11 at a position directly above the associated fuel assembly in a mode similar to that described already with reference to FIGS. 1 and 2. Molten metal 36 is contained in the well 7 so as to ensure satisfactory transmission of sound between the reactor in-vessel sensor 35 and the well 7. Although the reactor in-vessel sensor 35 is shown in FIG. 4 in a form separated from the well 7 to provide a double structure so that the sensor 35 can be easily replaced by a spare one when so required, the sensor 35 and the well 7 may be integrally combined together in a modification of the present invention.

Built in the casing of the reactor in-vessel sensor 35 are a pair of magnetic cores 33 and 33' of ferromagnetic material such as pure iron split into halves in the vertical direction, and a magnetostrictive vibrator element 30 of a magnetostrictive material such as an iron-cobalt alloy disposed between the cores 33 and 33'. The magnetostrictive vibrator element 30 is shown firmly bonded at its lower end surface to the lower pure-iron core 33' by a heat-resistive adhesive, while this magnetostrictive vibrator element 30 is not bonded to or spaced at its upper end surface from the upper pure-iron core 33. Thus, the magnetostrictive vibrator element 30 has a free and freely vibratable surface so as to allow its vibration preventing propagation of acoustic energy to the upper pure-iron core 33. The lower pure iron core 33' is firmly bonded to the casing of the reactor in-vessel sensor 35 by a heat-resistive adhesive. However, the acoustic coupling between the reactor in-vessel sensor 35 and the well 7 is satisfactorily ensured without bonding the sensor 35 to the well 7 because of the presence of a thin layer of molten metal 36 between them. The magnetostrictive vibrator element 30 has a thickness which is determined by the required acoustic frequency. Although the temperature of the upper part of the reactor may exceed 600° C., the reactor in-vessel sensor 35 including the pure-iron cores 33, 33' and magnetostrictive vibrator element 30 of materials as described above can sufficiently withstand such high temperature. An exciting primary coil 31 and a pair of symmetrical secondary coils 32 are wound around a ceramic bobbin 34 surrounding the pure-iron cores 33 and 33', and the surface of each of these coils 31 and 32 is electrically insulated by a ceramic coating. The pure-iron cores 33 and 33' are engaged by the upper and lower ends of the ceramic bobbin 34 at their upper and lower end portions 38 respectively. The two secondary coils 32 and the two pure-iron cores 33, 33' are arranged in vertically symmetrical relation as shown.

Figure 2:
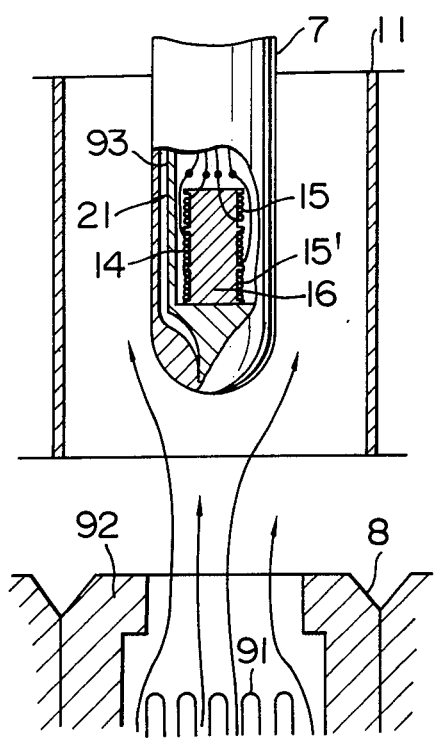
FIG. 2 is a schematic sectional view showing the structure and installation of a prior art eddy-current type temperature-velocity sensor.
Figure 3:
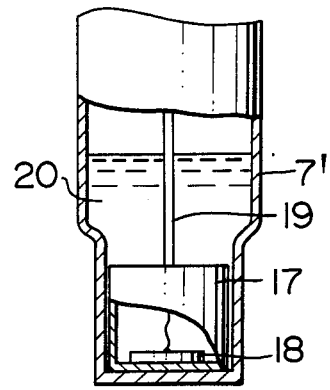
FIG. 3 is a schematic sectional view of an acoustic transducer constructed in an intermediate step of the effort which leads to the present invention.

The volume of the reactor in-vessel sensor 35 having a structure as described above is approximately the same as that of the prior art eddy-current type temperature-velocity sensor 21 shown in FIG. 2, and the number of outgoing signal lines of the former is also equal to that of the latter. The size of the reactor in-vessel sensor 35 shown in FIG. 4 will be further reduced when the upper pure-iron core 33 and the vibration element 30 are fabricated to have the outer peripheral edges of their confronting end surfaces slightly projecting from the remaining portions to bond the outer peripheral edges thereby eliminating the ceramic bobbin 34, and the primary and secondary coils 31 and 32 are wound directly around the upper and lower pure-iron cores 33 and 33'.

According to the above-described structure of the reactor in-vessel sensor 35, the magnetostrictive vibrator element 30 mounted in the sensor 35 can vibrate as designed, and sound originated in the coolant flowing around the well 7 can be efficiently transmitted to the magnetostrictive vibrator element 30, so that required measurement can be done without any interference even when the vibrator element 30 is positioned in the middle of the well 7. The shape of the sound radiating surface 39 at the bottom of the well 7 is not especially limited. However, such a surface 39 is preferably as planar as possible to exhibit a sharp directivity. When the bottom of the well 7 is so shaped, sound is effectively radiated toward the upper surface of the fuel assembly 92 of the reactor core 8 containing the fuel pins 91 as shown in FIG. 2, and the sound reflected from the surface can be sensed with a high directivity, so that the accuracy of sensing the charged or mounted level of the fuel assembly can be improved.

In the reactor in-vessel sensor 35 shown in FIG. 4, the alternating magnetic flux appearing from the primary coil 31 is influenced by a change in the flow velocity of sodium flowing around the well 7 and is also influenced by a change in the electrical resistance, hence, the temperature of sodium, as described already. Therefore, the secondary coils 32 generate induced AC voltage signals which are a function of the temperature and velocity of sodium. Further, sound which is indicative of occurrence of a core anomaly, if any, in the reactor as described already and transmitted to the magnetostrictive vibrator element 30 through sodium flowing around the well 7 causes expansion and contraction of the magnetostrictive vibrator element 30 in the vertical direction, and the magnetization pattern of the magnetostrictive vibrator element 30 is changed to cause generation of an acoustic signal from the primary coil 31. Although an AC signal for energizing the pure-iron cores 33 and 33' is flowing through the primary coil 31, the frequency of the voltage signals generated from the secondary coils 32 is different from that of the acoustic signal generated from the primary coil 31, as described later. These signals are applied through a heat-proof cable 37 to a preamplifier 40 disposed outside of the reactor.

Amplifiers 40a and 40b in the preamplifier 40 amplify the voltage signals 32a and 32b from the two secondary coils 32 respectively. On the other hand, the acoustic signal 31a from the primary coil 31 passes through the preamplifier 40, and its high-frequency component only, that is, the component higher than, for example, 10 kHz that can be distinguished from the frequency of the eddy-current exciting signal, is extracted by a high-pass filter 42 to be applied then to a detector 44. Although an oscillator 41b in an exciter 41 supplies the exciting signal having a frequency of 200 Hz to 500 Hz, it is easily separated by the high-pass filter 42 since the acoustic signal 31a has a high frequency of 1 kHz to 100 kHz. The high-pass filter 42 acts to further filter low-frequency components included in the acoustic signal 31a. The output signals from the amplifiers 40a and 40b in the preamplifier 40 are applied to a band-pass filter 43 which acts to extract signal components of 200 Hz to 500 Hz only from the induced voltage signals 32a and 32b appearing from the secondary coils 32, respectively.

A temperature-velocity computer 45 includes a signal adder 45c and a signal subtractor 45d to each of which the two output signals from the band-pass filter 43 are applied respectively, a first synchronous detector 45a in which the output signal from the signal adder 45c is subjected to synchronous detection in response to a synchronizing signal 49 applied from the exciter 41, and a second synchronous detector 45b in which the output signal from the signal subtractor 45d is subjected to synchronous detection in response to the synchronizing signal 49 applied from the exciter 41. This synchronizing signal 49 is the exciting AC signal applied from the exciter 41 to the primary coil 31. A temperature signal appears at the output of the first synchronous detector 45a, and a velocity signal appears at the output of the second synchronous detector 45b. The synchronous detection in these synchronous detectors 45a and 45b removes unnecessary signals, noise, etc. except the frequency components applied from the exciter 41. The band-pass filter 43 may be eliminated for economy since most synchronous detectors have a function of a band-pass filter.

Description will now be directed to how the relative height of the flow guide portion associated with the fuel assembly 92 shown in FIG. 2 is measured by observation through sodium flow in the fast breeder reactor.

An image processor 46 for the observation through the sodium flow shown in FIG. 4 is connected to a pulse generator 41a in the exciter 41 to trigger the pulse generator 41a. This pulse generator 41a generates a single pulse or a few pulses when triggered. This pulse signal is added in a signal adder 41c to the AC exciting signal generated from the oscillator 41b, and the output signal from the signal adder 41c is applied through the preamplifier 40 to the primary coil 31 in the reactor in-vessel sensor 35 housed in the well 7. The pulse current flowing through the primary coil 31 is converted into mechanical vibration by the magnetostrictive vibrator element 30, and the sound radiating surface 39 of the well 7 radiates sound downward in FIG. 4. Markings are provided on the upper surface of the fuel assembly 92 of the reactor core 8 shown in FIG. 2 so as to characterize the sound reflected from such a surface of the fuel assembly 92. The reflected sound reaches the sound radiating surface 39 of the well 7 to cause vibration of the magnetostrictive vibrator element 30 through the pure-iron core 33', with the result that a pulse signal due to the reflected sound is induced in the primary coil 31. The length of time required until the reflected sound is received after radiation of the sound from the sound radiating surface 39 of the well 7 depends on the distance between the radiating surface and the reactor core 8. The pulse signal induced due to the reflected sound is applied by the heat-proof cable 37 to the high-pass filter 42 through the preamplifier 40, so that unnecessary noise components at frequencies lower than 10 kHz and exciting signal components of 200 Hz to 500 Hz are removed. The output signal from the high-pass filter 42 is applied through the detector 44 to the image processor 46. Signals r and θ indicative of the angular position of the small rotary plug 5 are applied to the image processor 46 by way of lines 48 and 47 respectively. It will be understood that the height of the fuel assembly 92 underlying the well 7 can be recognized by the arrangement described above.

Similar measurement is done for all of the sensor wells provided for each of the many fuel assemblies in the fast breeder reactor. The sensor well is scanned in the horizontal direction using the double rotary plug during the measurements so as to apply the height data to the image processor 46. These data are edited to display, on the display screen of the image processor 46, a view of all of the height data of the fuel assemblies in the fast breeder reactor. A bird's eye view of the upper core would be obtained by the coordinate transformation of these data. Thus, a single acoustic sensor 35 can measure increased information of the sodium temperature, flow velocity and acoustic response thereby ensuring high-accuracy detection of occurrence of a core anomaly, if any in the reactor. Moreover an anomaly in the displayed view of the upper core is detected on the screen by the above mentioned measurements. Thus, according to the measuring system described with reference to FIG. 4, flow blockage within the fuel assemblies can be detected by sensing a decrease of the flow velocity of sodium or an increase of the temperature of sodium flowing through the fuel assembly being monitored. Further, an early-stage trouble which is not so serious compared with the flow blockage trouble can also be detected on the basis of a change of the characteristics of the acoustic signal in the course of generation and extinction of voids in the sodium flow due to partial boiling. Drawing of cover gas into the sodium flow can also be detected by detecting a change in the bursting sound of gas bubbles, individual acoustic sensor 35. Not only the presence of a void but also its position can be detected on the basis of a change of the acoustic signal and various time for reaching each individual acoustic sensor 35 on each position. When a void arrives at the well 7 surrounding the reactor in-vessel sensor 35, the temperature signal and velocity signal are also affected by the presence of such a void. Therefore, more accurate judgment of such a core anomaly can be made by monitoring the temperature and velocity signals in combination with the acoustic signal. Further, the presence or absence of a loose part in the reactor, its position and the presence or absence of foreign matters intruding into the reactor from the exterior can be detected when the response of the acoustic signal from various parts of the reactor due to collision noise is previously checked to find the relation between the amplitude detected by each individual acoustic sensor and the detection delay time of each individual acoustic sensor depending on the position of collision.

The embodiment of the present invention provides the following advantages among others:

(1) A single reactor in-vessel sensor has the function of sensing three kinds of physical quantities, the velocity, temperature and sound, and the size of the sensor is substantially equivalent to that of a prior art eddy-current type temperature-velocity sensor. Therefore, the sensor can be provided for each of the fuel assemblies.

(2) The temperature and velocity signals and the acoustic signal having different frequency bands can be easily distinguished by corresponding filters. Therefore, the number of required signal lines can be made equal to that of the prior art eddy-current type temperature velocity sensor.

(3) The number of sound detection points is increased compared to that customarily provided in the prior art, so that the location of occurrence of a core anomaly, if any, in the reactor can be more reliably identified. Also, such a core anomaly among various possible abnormal conditions can be more accurately identified by monitoring the temperature and velocity signals in combination with the acoustic signal.

(4) Application of the present invention to a reactor equipped with a multiple rotary plug permits observation through sodium flow without requiring any especial actuating arm. Also, the increased number of sound detection points can greatly shorten the required scanning time.

(5) The acoustic sensor using a magnetostrictive vibrator element shows a high resistance to heat and impact.

One reactor in-vessel sensor 35 can be provided for each of the fuel assemblies according to the present invention. Therefore, when these reactor in-vessel sensors 35 for sodium flow observation purpose are used for the transmission and reception of ultrasonic wave in the shut-down stage of the reactor, and the aforementioned double rotary plug 3 is actuated, scanning for the purpose of measurement of the relative vertical positions of the fuel assemblies in the entire range of the reactor core can be completed within a relatively short period of time. The signals r and θ changing with the angular rotation of the double rotary plug 3 are processed by the image processor 46. Also, the present invention eliminates the need for provision of any especial actuating arm for the purpose of scanning.

Figure 5:
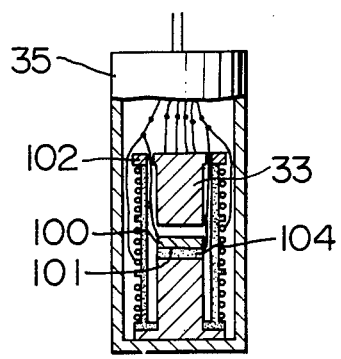
FIG. 5 is a schematic sectional view of a modification of the reactor in-vessel sensor of the present invention in which the magnetostrictive vibrator element shown in FIG. 4 is replaced by a piezoelectric vibrator element.

Another embodiment of the sensor according to the present invention will be described with reference to FIG. 5. The embodiment shown in FIG. 5 is a modification of that shown in FIG. 4 in that the magnetostrictive vibrator element 30 is replaced by a piezoelectric vibrator element 100. The modification shown in FIG. 5 differs also from the embodiment shown in FIG. 4 in that leads extending from the electrodes on the upper and lower surfaces of the piezoelectric vibrator element 100 are connected to the primary coil 31 through holes 102 bored in the core 33. Electrically, the primary coil 31 and the piezoelectric vibrator element 100 are connected in parallel with each other. In order to electrically insulate the piezoelectric vibrator element 100 from the casing of the sensor 35, an electrical insulating disc 104 of a ceramic material is inserted between and bonded to the lower electrode 101 of the piezoelectric vibrator element 100 and the lower core 33'. In the reactor in-vessel sensor 35 having such a structure, the piezoelectric vibrator element 100 can be considered electrically as a kind of a capacitor. Since the frequency of the signals 32a and 32b passed through the band-pass filter 43 to obtain the temperature and velocity signals is low, this capacitor has a high impedance such that its influence on the primary coil 31 is negligible. Since, on the other hand, the frequency of the signal 31a passed through the high-pass filter 42 to obtain the acoustic signal is high, the impedance of the piezoelectric element 100 is not negligible compared to that of the primary coil 31. However, such an impedance does not give to any practical problem especially when the piezoelectric element 100 is made of $LiNbO_3$ having a low permittivity. A resonance circuit commonly used in, for example, an ultrasonic inspector may be additionally provided so that the sensor shown in FIG. 5 can operate with high sensitivity.

Figure 6:
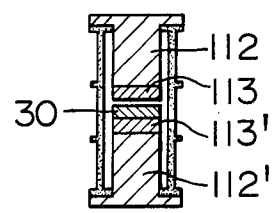
FIG. 6 is a schematic sectional view of another embodiment view of another embodiment of the reactor in-vessel sensor of the present invention.

FIG. 6 is a schematic sectional view of still another embodiment of the sensor according to the present invention. Referring to FIG. 6, a pair of symmetrical bias magnets 113 and 113' are bonded to the confronting surfaces of a pair of vertically symmetrical pure-iron cores 112 and 112' respectively. A magnetostrictive vibrator element 30 similar to that shown in FIG. 4 is bonded to the surface of the magnet 113' which is nearer to the sound radiating surface of the sensor than the magnet 113. These two bias magnets 113 and 113' are disposed in such a relation that the different magnetic poles confront each other in the vertical direction, so that the magnetostrictive vibrator element 30 lies in an electrostatic field established by the two bias magnets 113 and 113'. That is, the induced voltage signals described with reference to FIG. 4 are generated under the condition in which the magnetostrictive vibrator element 30 is placed in a bias magnetic field. As is commonly known, the magnetostrictive vibrator element 30 generates a high voltage output under influence of a suitable electrostatic bias field. In order to improve the accuracy of computation by the temperature velocity computer 45 described with reference to FIG. 4, it is required to maintain the vertical symmetry of the mechanical structure shown in FIG. 6.

Such an electrostatic bias field may be similarly established by inserting a slim bar magnet extending through the center of the cores 112 and 112' in FIG. 6 or by supplying a direct current through the primary coil 31.

The magnetostrictive or piezoelectric vibrator element may be brought into engagement with the casing of the sensor container.

We claim:

1. A sensor for monitoring the interior of a reactor, comprising a magnetic core member including a magnetostrictive or piezoelectric vibrator element in a portion thereof, a primary coil excited by an alternating current, a plurality of secondary coils electromagnetically coupled to said primary coil, said primary and secondary coils surrounding said magnetic core member, and a casing enclosing therein said magnetic core member and said primary and secondary coils, whereby the temperature and flow velocity of a conductive liquid flowing outside of said casing are sensed, and a sound wave originated in said conductive liquid is received by said primary coil through said vibrator element.

2. A sensor as claimed in claim 1, wherein said magnetic core member is split into a first core brought into engagement with said sensor casing and a second core spaced apart from said first core, and said magnetostrictive or piezoelectric vibrator element is bonded to the surface of said first core opposite to said second core.

3. A sensor as claimed in claim 1, wherein said magnetostrictive or piezoelectric vibrator element is brought into engagement with said sensor casing.

4. A sensor as claimed in claim 2, wherein a first bias magnet and a second bias magnet are provided for establishing an electrostatic bias field, said first bias magnet being interposed between said first core and said vibrator element, said second bias magnet being disposed on the surface of said second core opposite to said first core.

5. An apparatus for monitoring the interior of a fast breeder reactor comprising:

a monitoring sensor comprising a magnetic core member including a magnetostrictive or piezoelectric vibrator element in a portion thereof, a primary coil excited by an alternating current, a plurality of secondary coils electromagnetically coupled to said primary coil, said primary and secondary coils surrounding said magnetic core member, and a casing enclosing therein said magnetic core member and said primary and secondary coils;

filter means for filtering, in response to the application of AC voltages induced in said secondary coils, to reduce frequency components except that having the frequency of said AC voltages;

signal computer means for executing the addition and subtraction of output signals from said filter means; and second filter means for filtering, in response to the application of a voltage induced in said primary coil, to reduce the frequency component of said AC voltages from said voltage signal applied from said primary coil.

6. A sensor for monitoring the interior of the reactor and for determining temperature and flow velocity of a conductive liquid flowing outside a casing, the sensor comprising a casing enclosing therein at least a primary coil excited by an alternating current, at least a secondary coil inductively coupled to said primary coil, and a magnetic core member disposed within said primary and second coils, said magnetic core member having a magnetostrictive or piezoelectric vibrator element attached thereto for transforming a sound wave originated in the conductive liquid into an electric signal induced in said primary coil.

7. A sensor as claimed in claim 6, wherein said magnetic core member has a first core portion brought into engagement with said sensor casing and a second core portion spaced apart from said first core portion, said magnetostrictive or piezoelectric element being bonded to the surface of said first core portion opposite to and spaced from said second core portion so as to have a freely vibratable end surface.

8. A sensor as claimed in claim 6, wherein said magnetostrictive or piezoelectric vibrator element is brought into engagement with said sensor casing.

9. A sensor as claimed in claim 7, further comprising a first bias magnet and a second bias magnet for establishing an electrostatic bias field, said first bias magnet being interposed between said first core portion and said vibrator element, and said second bias magnet being disposed on the surface of said second core portion opposite to said vibrator element.

10. A sensor as claimed in claim 6, wherein said at least one secondary coil is disposed in symmetrical relation with respect to said primary coil and inductively coupled to said primary coil, said magnetic core member including a first magnetic core disposed within said primary and second coils and brought into engagement with said sensor casing, and a second magnetic core disposed within said primary and secondary coils so as to be spaced from and facing a surface of said first magnetic core, said magnetostrictive or piezoelectric vibrator element being bonded to the surface of said first magnetic core facing said second magnetic core and being spaced from said second magnetic core so as to have a freely vibratable end portion.

* * * * *